United States Patent [19]

Meyer et al.

[11] 4,209,237

[45] Jun. 24, 1980

[54] DRAWING DEVICE

[75] Inventors: Burton C. Meyer, Downers Grove; Wayne A. Kuna, Elmhurst, both of Ill.

[73] Assignee: Marvin Glass & Associates, Chicago, Ill.

[21] Appl. No.: 968,351

[22] Filed: Dec. 11, 1978

[51] Int. Cl.$^2$ .............................................. G03B 21/22

[52] U.S. Cl. ......................................... 353/75; 353/97

[58] Field of Search ........................ 353/74, 89, 75, 97, 353/44, 121, 122; 350/121, 122; 40/361, 367; 35/26; 355/74, 125, 126

[56] References Cited

U.S. PATENT DOCUMENTS

| | | | |
|---|---|---|---|
| 1,559,665 | 11/1925 | Beery et al. | 353/44 X |
| 1,572,671 | 2/1926 | Myers | 353/12 |
| 2,301,274 | 11/1942 | Greiser | 353/97 X |
| 3,699,660 | 10/1972 | Siegel | 33/174 B |
| 3,768,899 | 10/1973 | Parra | 353/82 |
| 3,914,038 | 10/1975 | Liguori | 353/82 X |

*Primary Examiner*—Harry N. Haroian
*Attorney, Agent, or Firm*—Mason, Kolehmainen, Rathburn & Wyss

[57] ABSTRACT

A device for projecting images from a film strip onto a suitable sheet of drawing paper includes a housing having a source of illumination mounted on the interior. A drawing surface is provided on the housing for supporting the drawing paper and a guideway mounting a film strip with images to be traced is located within the housing between the source of illumination and the drawing surface. A shield is rotatably mounted in the housing to block a part of the film strip from the source of illumination, so that, at any given time, only a portion of an image on the film strip is projected onto the drawing surface. A device for rotating the shield to sequentially expose the entire image to the source of illumination is provided and interconnected to a device for generating a sound as the shield is rotated. An index member is defined on the housing for indexing the film strip within the housing.

10 Claims, 5 Drawing Figures

DRAWING DEVICE

BACKGROUND OF THE INVENTION

A. Field of the Invention

The device in the present invention relates to a new and improved toy for tracing images that are projected from a film strip.

B. Description of the Prior Art

It is desirable that toys be both entertaining and educational while also developing a skill. One of the favored devices for developing eye-hand coordination and artistic skill in children is a toy that the child may employ for drawing pictures or the like. Many different devices, such as coloring books, have been provided for such a procedure; however, it is desirable that the child not only learn to draw or color within an outline such as that provided in a coloring book, but is also desirable that the child create the outline or a picture through his own efforts. Such a desired result can be accomplished by a tracing device wherein the child traces onto a sheet of paper a figure or image that has been professionally drawn.

SUMMARY OF THE INVENTION

An object of the present invention is to provide a new and improved toy for tracing onto a sheet of paper an image projected and enlarged from an image imprinted on a film strip.

A further object of the present invention is to provide a new and improved toy for tracing an image onto a sheet of paper wherein only a portion of the image is projected onto the paper and the operator of the toy can project different portions of the image as each portion is completed.

The present invention is directed to a new and improved drawing device including a housing with a top drawing surface and a source of illumination mounted within the housing. A film strip support or guide is provided in the housing and serves to support a film strip or other media on which images are imprinted at a location such that the images are projected onto the drawing surface by the source of illumination. A shield is rotatably mounted within the device in a position such that a portion of the film strip is shielded from the source of illumination such that, at a given time, only a portion of the image is projected onto the drawing surface. The user of the device may draw a portion of the image and then rotate the shield to illuminate another portion of the image. Once all the portions have been drawn, the film strip may be advanced to show another portion of the complete drawing whereupon the procedure is repeated. A device for creating audible sound may be provided that produces an entertaining sound as the shield is rotated to project another portion of the image.

BRIEF DESCRIPTION OF THE DRAWINGS

The above and other objects and advantages and novel features of the present invention will become apparent from the following detailed description of the preferred embodiment of the invention illustrated in the accompanying drawings wherein.

DETAILED DESCRIPTION OF THE PREFERRED EMBODIMENT

Figure 1:
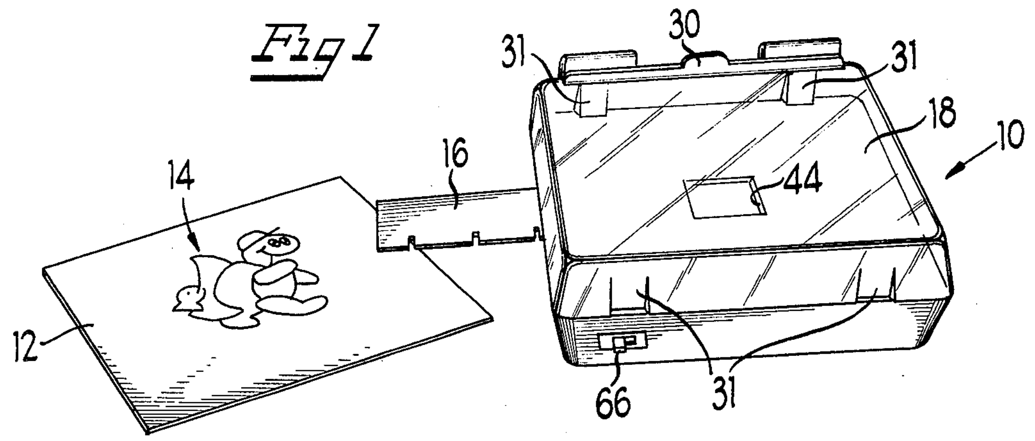
FIG. 1 is a perspective view of the drawing device of the present invention including a finished drawing.
Figure 2:
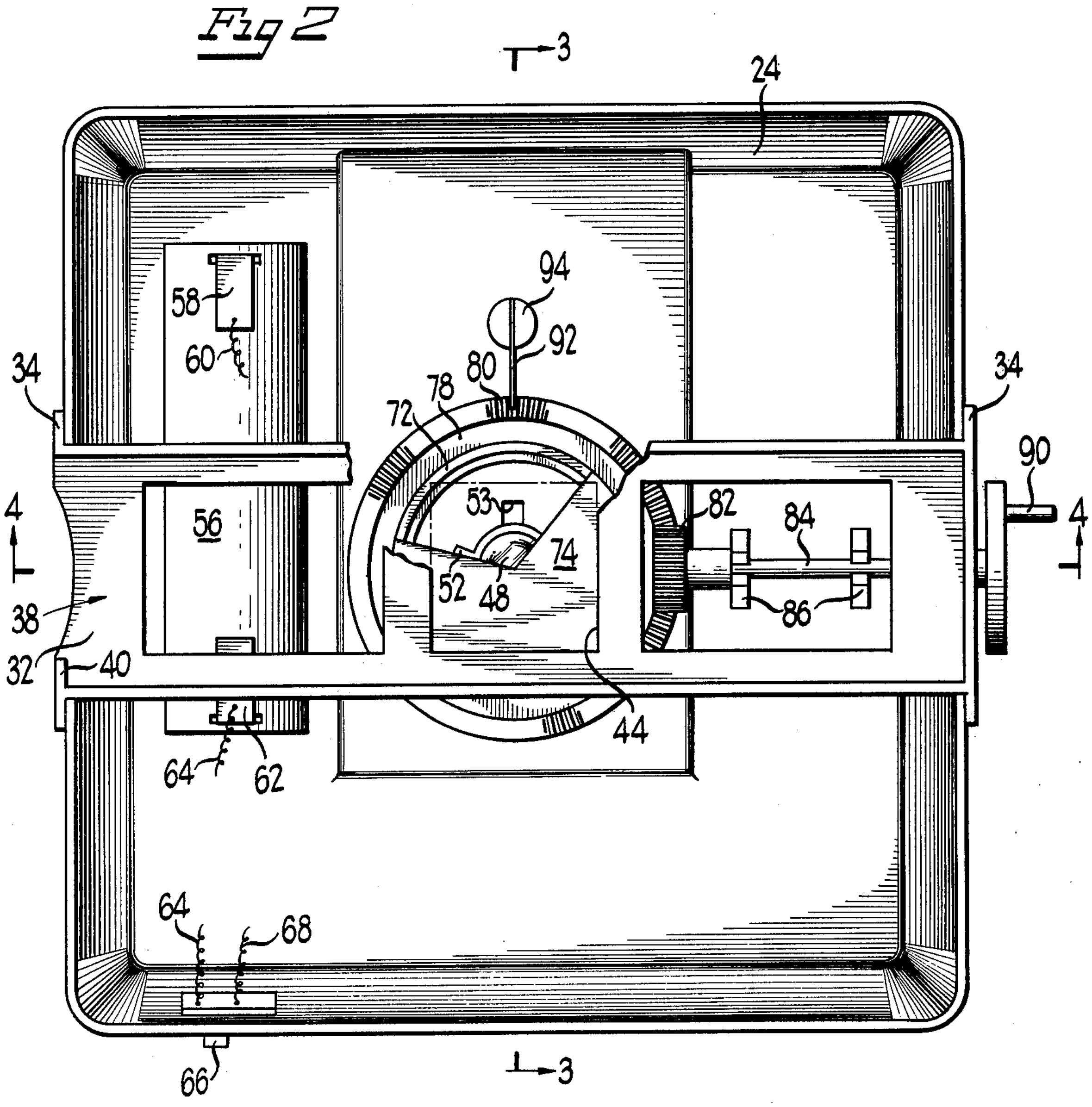
FIG. 2 is an enlarged, horizontal cross-sectional view of the device of the present invention.

Having reference to the drawings and initially to FIG. 1, there is disclosed the drawing toy of the present invention generally designated by the reference numeral 10. The drawing device or toy 10 is employed by the user, such as a child, to trace onto a sheet of paper 12 a drawing generally designated by the reference numeral 14. The drawing 14 is traced from one or more images imprinted on a film strip 16 and projected onto a drawing surface 18 defined on the top of toy 10. The user of the toy 10 then traces the projected image onto the paper 12 from the film strip 16.

Figure 3:
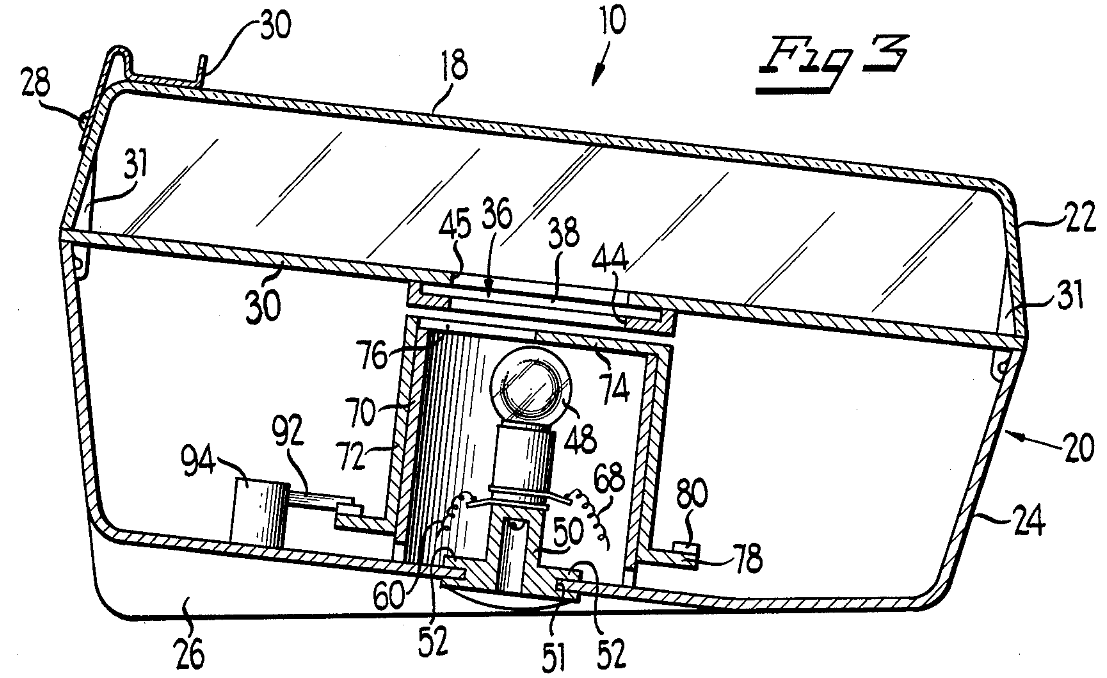
FIG. 3 is a vertical cross-sectional view taken along line 3—3 of FIG. 2.
Figure 4:
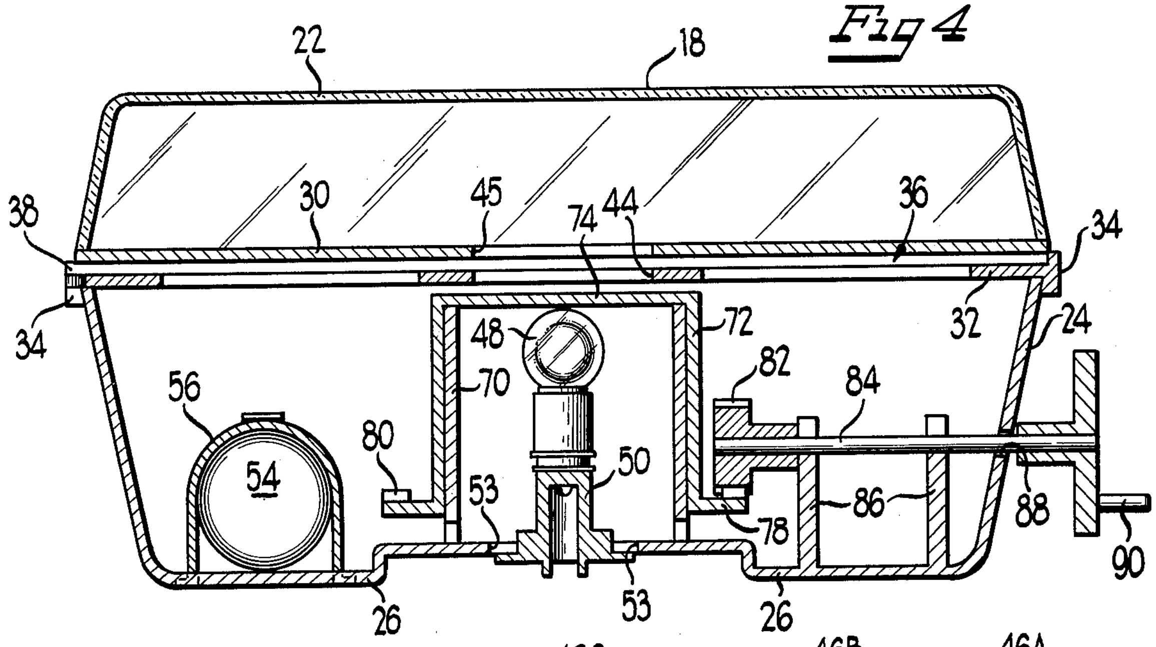
FIG. 4 is a vertical cross-sectional view taken along line 4—4 of FIG. 2.

The toy 10 is generally defined by a housing 20 that includes a top portion 22 fabricated of transparent material such as plastic or the like which defines the drawing surface 18. The housing 20 also includes a lower housing portion 24 that defines a plurality of support legs 26 to support the surface 18 in an inclined orientation as shown in FIG. 3. The drawing surface 18 and the upper housing portion 22 are transparent to allow the projection of an image onto the sheet of paper 12 once it is positioned on the drawing surface 18. The paper 12 is held on the surface 18 by a longitudinal clip 30 secured by screws 28 to the rear of the drawing surface 18. A plurality of integrally molded wall recesses 31 serve to allign the housing portion.

The upper housing portion 22 includes a bottom plate or surface 30 which includes an integral film strip holding channel or member 32 mounted between the housing portions. More specifically, the film strip holding member 32 includes a flange 34 on each end which also locates the upper housing 22 on the lower housing 24 and defines a gap 36 between the lower surface 30 of the upper housing portion 22 and the film strip holding member 32. The film strip holding surface 32 thereby defines a channel with an opening 38 to allow the introduction of the film strip 16.

The film holding member 32 also includes an indexing flange 40 that is intended to fit within one of a plurality of slots 42 defined in one edge of the film strip 16 for accurately positioning the film strip 16 within the toy 10. The film strip channel 32 includes a generally square, central aperture 44. The aperture 44 is aligned with an aperture 45 defined in the bottom wall 30 of the top housing portion 22.

Figure 5:
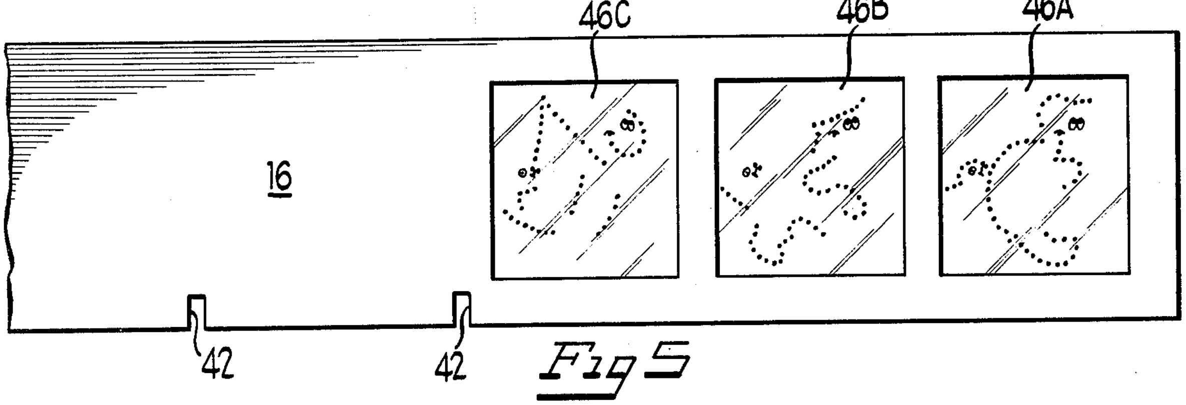
FIG. 5 is an enlarged view of a film strip including images printed thereon.

The film strip 16 includes a plurality of frames 46 A, 46 B, and 46 C on which a portion of an image to be traced appears. In the operation of the toy 10, it is intended that one of the frames, for example, frame 46A be positioned between the apertures 44 and 45 for projection onto the drawing surface 18 to allow the user of the toy 10 to trace the projected image onto the sheet of paper 12. In one form, the film strips 16 are opaque and the dots shown in FIG. 5 are formed of small translucent spots in the filmstrip.

Positioned beneath the apertures 44 and 45 in a source of illumination provided by a light source such as a bulb 48 mounted within a base 50. The base 50 is removably mounted within an aperture 51 by a pair of flanges 52. The flanges 52 are inserted through slots 53 defined within the bottom housing portion 24. Electrical energy to illuminate the bulb 48 is provided by a battery 54 that is held in position by a U-shaped housing 56 to the bottom wall of the housing portion 24. The battery housing 56 includes a first terminal 58 that is connected by line 60 to the light bulb and a second terminal 62 connected by line 64 to an on-off switch 66 in the front wall of the housing portion 24. The switch 66 is electrically connected by a second line 68 to the light bulb 48 and thus controls the energization of the bulb 48.

A central support 70, that in the preferred embodiment is of a cylindrical configuration, is secured to the base of the housing portion 24 and extends upwardly to surround the bulb 48. A cylindrical shield 72, including a flat, top portion 74 is rotatably positioned on the support 70. The top portion 74 is larger than the apertures 44 and 45, but includes an angular or pie-shaped cut-out 76 removed therefrom to allow illumination from the bulb 48 to shine upwardly through the apertures 44 and 45 onto the drawing surface 18. The remaining portion of the top 74 serves as the shield to block light from the bulb. Therefore, it can be seen that only a portion of the frame 46 A, 46 B or 46 C will be projected by the point source, bulb 48.

Means are provided to rotate the shield to project, sequentially all of the image onto the drawing surface. The cylindrical portion of the shield 72 includes a lower flange 78 with gear teeth 80 defined on the upper surface thereof. The teeth 80 mesh with a drive gear 82 which is mounted on the inner end of a rod 84. The rod 84 is rotatably mounted by a pair of supports 86 on the base and extends through an aperture 88 in the side of housing portion 24. A handle 90 on the exposed end facilitates manual rotation of the rod 84. By rotating the rod 84, the gear 82 and shield 72 are also rotated relative to the light bulb 48 thus exposing a different portion of the frame 46 A, 46 B, or 46 C to the light 48.

In addition, a sounding device is operated as the shield 72 is rotated as described above. The sounding device includes a sound maker or reed 92 with a first end secured to a stationary support 94 and a second end engagable with the teeth 80 such that as the shield 72 is rotated, the teeth 80 engage the sound maker 92 creating an audible sound.

The use of the shield 74 allows the user of the toy 10 to project different portions of each image of the complete drawing 14 onto the drawing surface 18 such that, once one portion of an image has been completely traced, the shield 74 may be rotated to expose a different portion of the image. The shield 74 is provided with a cut-out 76 having at least an obtuse angle of approximately 120° so that 3 positions of shield will entirely expose the frame. Once a complete image has been drawn or traced from frame 46 A, the film strip 16 may be advanced and the next frame, for example 46 B. Once all the frames have been exposed and traced, and complete drawing 14 has been constructed.

In the preferred embodiment illustrated, the frames 46 A, 46 B and 46 C each include dots that are intended to be connected to provide a complete drawing. As best illustrated in FIG. 5, each of the three frames 46 A, 46 B and 46 C include dots outlining a different portion of the finished drawing 14 illustrated in FIG. 1. Accordingly, to operate the toy 10 in the preferred embodiment illustrated, the user aligns the first frame 46 A adjacent the apertures 44 and 45 and locks it into position by engagement of a respective slot 42 in the indexing member 40. The switch 66 is then actuated to energize the bulb 48 thus projecting a portion of first frame 46 A onto the drawing surface 18. It should be noted that the distance between the source 48 and the drawing surface 18 may be preselected so that the projected image is magnified approximately 4 to 1 on the drawing surface 18.

After the user of the toy 10 has connected the dots corresponding to a portion of the image imprinted on frame 46 A, the shield 74 may be rotated by rotating the handle 90 to rotate the open portion 76 of the shield 74 to a position to expose another portion of the frame 46 A whereupon the dots in that portion of the frame may be connected. Once the entire frame 46 A has been projected onto the drawing 18, the user of the toy 10 may lift the film 16 to move the slot 42 out of engagement with the indexing member 40 and advance the next frame 46 B adjacent to the apertures 44 and 45 and then complete that portion of the drawing as depicted by the frame 46 B. This same procedure can be performed with the frame 46 C with the result being a complete drawing.

While only a single embodiment of the present invention has been shown, it will be understood that various changes and modifications may occur to those skilled in the art and it is contemplated by the appended claims to cover all such changes and modifications in accordance with the true spirit and scope of the present invention.

What is claimed as new and desired to be secured by Letters Patent of the United States is:

1. A drawing device, comprising:
- a housing including a top surface defining the drawing surface and a compartment for positioning an image carrier;
- an image carrier comprising a film strip including a plurality of descrete frames, each of said discrete frames including a portion of a total image;
- a source of illumination positioned in said compartment for sequentially projecting said discrete portion image from the carrier onto said drawing surface;
- means for indexing said film strip relative to said source of illumination to project subsequent image portions in registry with previous image portions; and
- means for shielding said source of illumination to permit projection of a predetermined portion of one of the discrete frames of the image carrier onto said drawing surface.

2. The apparatus of claim 1 further comprising means for moving said shielding means to allow projection of different portions of said image onto said drawing surface.

3. The apparatus of claim 2 further comprising means for producing an audible signal upon actuation of said moving means.

4. The apparatus of claim 2 or 3 wherein said shielding means comprises a rotatable element mounted between said source of illumination and said drawing surface, said rotatable element including a cutout portion permitting light to pass therethrough to project the image onto the drawing surface.

5. The apparatus of claim 4 including a gear train and crank means for selective manual rotation of said element relative to said source of illumination.

6. The apparatus of claim 1 wherein the top of the housing is made of substantially rigid transparent material to define the drawing surface whereby the image is projected by the source of illumination onto the side of the drawing surface remote from the user.

7. The apparatus of claim 6 wherein the drawing surface is spaced from the image carrier and said source of illumination to provide for a substantial enlargement of the image projected onto the drawing surface from the image carrier.

8. The apparatus of claim 1 wherein said film strip comprises a plurality of longitudinally spaced discrete frames.

9. The apparatus of claim 1 or 8 wherein said indexing means comprises means aligned with said image carrier positioning compartment and said image carrier comprises a plurality of complementary engageable means for engaging the same to properly align the film strip relative to the source of illumination.

10. The apparatus of claim 9 wherein said aligned means comprises an aligning notch on the housing and said complementary engageable means comprises a plurality of transverse slots in said film strip.

* * * * *